United States Patent [19]

Sakurai et al.

[11] Patent Number: 4,622,070
[45] Date of Patent: Nov. 11, 1986

[54] FIBROUS COMPOSITE MATERIAL FOR FUSED ALUMINUM

[75] Inventors: Seiji Sakurai, Kanagawa; Kaoru Umino, Tokyo, both of Japan

[73] Assignee: Nichias Corporation, Tokyo, Japan

[21] Appl. No.: 671,304

[22] Filed: Nov. 14, 1984

[30] Foreign Application Priority Data

Nov. 16, 1983 [JP] Japan ............................... 58-214078

[51] Int. Cl.⁴ ............................................... B28B 7/36
[52] U.S. Cl. .............................. 106/38.22; 106/38.23; 106/38.27; 164/14; 252/62
[58] Field of Search ............... 106/38.22, 38.27, 38.28, 106/18.12, 38.23, 197.1, 197.2; 252/62; 164/14, 33; 524/2

[56] References Cited

U.S. PATENT DOCUMENTS 3,725,095  4/1973  Weidman et al. ...................... 252/62
3,916,057  10/1975  Hatch et al. ...................... 106/18.11

Primary Examiner—Lorenzo B. Hayes
Attorney, Agent, or Firm—Cushman, Darby & Cushman

[57] ABSTRACT

A fibrous composite material useful in contact with fused aluminum or aluminum alloys is disclosed. The composite material is comprised of alumino silicate-based ceramic fibers, at least one micaceous mineral, an inorganic binder, a dispersant and a plasticizer.

9 Claims, No Drawings

FIBROUS COMPOSITE MATERIAL FOR FUSED ALUMINUM

BACKGROUND OF THE INVENTION

The present invention relates to a fibrous composite material for use in contact with fused aluminum or aluminum alloys.

Conventionally, the shell of a molten metal container and a guide tray for use in melting and casting of aluminum or its alloys, is made of an iron plate and its inner walls are lined with unshaped refractories such as castable or plastic refractories, or high alumina content bricks. The refractories protect the iron plate from an attack by the chemically active aluminum melt, from deposition associated with the attack, and from the iron plate contaminating the aluminum melt.

Refractory bricks or unshaped refractories which are widely used as lining refractories, generally have satisfactory heat-insulating properties but suffer from the disadvantage of high thermal conductivity (1.1–1.5 kcal/mh°C. for high alumina content bricks and 0.5–1.2 kcal/mh°C. for castable refractories). When the aluminum melt comes into contact with such refractories, the temperature of the aluminum melt seriously drops. In response to this disadvantage, energy saving heat-insulating boards or fibrous heat-insulating materials have received increased attention in recent years.

The inorganic fibers which are generally used in production of fibrous heat-insulating materials include $SiO_2$-based fibers such as alumino silicate, silica, glass, and mineral wool, alumina fibers, and zirconia fibers. Among others, alumino silicate-based ceramic fibers are widely used since they have a low bulk density, are light-weight, exhibit a great heat-insulating effect, are superior in antispalling properties, are excellent refractories and therefore are energy-saving and economically advantageous.

It is widely recognized that the alumino silicate-based ceramic fibers have many advantages in heat-insulation applications. They have, however, poor chemical stability when used in applications where they contact directly with an aluminum melt. The article "Effect of Molten Aluminum on Alumini-Silica Refractories", *J. Am. Ceram. Soc.*, 35, 5, (1953), notes that alumina-silica-based refractories (bricks) are easily attacked by fused aluminum. This is also true of alumino silicate-based ceramic fibers. That is, when the ceramic fiber comes into contact with an aluminum melt, the $SiO_2$ component of the ceramic fiber is reduced as indicated by the equation below and the Si formed is dissolved in the melt, resulting in gradual deterioration of the ceramic fiber.

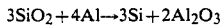

$$3SiO_2 + 4Al \rightarrow 3Si + 2Al_2O_3$$

Particularly in the case of molten aluminum alloys, the above reaction occurs markedly. As the reaction proceeds, deteriorated areas of the ceramic fiber form a dense modified layer (attacked layer), causing melt contamination and also attachment of the ground metal. The attached ground metal causes various problems, for example, the lining is damaged when attached ground metal is removed. Moreover, if part of the dense mass in the attacked areas is present in the melt, an inclusion is formed causing the formation of defects in casts. When the casts are rolled, metallic rolling members may be damaged. Thus, if a composite material containing alumino silicate-based ceramic fibers is to be used in contact with an aluminum melt, it is essential that the ceramic fibers be improved to resist corrosion.

A method of obtaining a material exhibiting a high resistance to permeation of an aluminum melt and an attack by the permeated aluminum melt is described in "How Molten Aluminum Affects Plastic Refractories", *J. Metals*, 35–37, January (1958). In the article, a clay compound mainly of kaolinite, a water-containing aluminum silicate, is subjected to a heat treatment and is used in the state of metakaolin. Based on the same technical concept, Japanese Patent Publication No. 17147/83 discloses a fibrous composite of kaolin clay and ceramic fibers. In this case, the composite is molded, dried, processed, and further calcined at elevated temperatures, thereby yielding the desired product.

In the case of the kaolin clay however, the degree of shrinkage involved in dehydration and transformation during the process of drying and calcination is large. For the composite of kaolin clay and ceramic fibers, the degree of shrinkage reaches about 2 to 5%. Thus, such a kaolin clay/ceramic fiber composite suffers from the limitation that it can be supplied only in the form of a molded article which has been subjected to a heat treatment at elevated temperatures of from 800° to 1,800° F. which are necessary to attain the formation of a metakaolin phase and its dimensional stabilization. Moreover, in cases where the composite is molded in complicated forms such as in the form of a pouring ladle or a distributor, much labor and difficulty are encountered in the molding operation. This disadvantage also occurs when the composite is applied to a heat-insulating board. Therefore, as a lining in a complicated form, the above-described castable or plastic refractory is usually used and applied in situ.

One object of this invention is to provide a fibrous composite heat-insulating material having improved performance.

Another object of this invention is to provide a fibrous composite material which will resist corrosion when in contact with an aluminium melt.

Another object of this invention is to provide a fibrous composite material which has minimal heat shrinkage and can be applied in situ.

SUMMARY OF THE INVENTION

The present invention relates to a fibrous composite material for use in contact with fused aluminum or aluminum alloys (hereinafter referred to as "aluminum melt"). The fibrous composite material is used to form a heat-insulating lining which is less easily wetted by an aluminum melt and, is superior in heat-insulating properties, dimensional stability and durability. As an example, the lining can be used in a molten metal container and a guide tray.

The present invention is a fibrous composite material comprising 1 part by weight of alumino silicate-based ceramic fibers and from 0.3 to 5 parts by weight of at least one powered micaceous mineral selected from the group consisting of muscovite, phlogopite, biotite, sericite, and vermiculite. The composite may also contain necessary amounts of an inorganic binder, a dispersant, and a plasticizer. The composite is mixed with water to form a paste, which is applied in situ or alternatively, is molded in a desired form, dehydrated by either natural drying or force drying, and thereafter used in contact with an aluminum melt. If necessary, additional layers of the paste made be added after dehydration.

Alumino silicate-based ceramic fibers are manufactured by melting various starting materials such as silica, alumina and kaolin and then producing fibers from the molten mass. They are commercially available as amorphous inorganic fibers where the alumina content is from 40 to 70% by weight, the silica content is from 30 to 60% by weight, the fiber diameter is from 1 to 5 μm, and the fiber length is more than about 1,000 times the fiber diameter.

For the micaceous minerals, muscovite, phlogopite, biotite, sericite, and vermiculite, the proportion of impurities such as quartz should be as low as possible. Also the mineral grain size should be very small, that is, a powder having a high specific surface area. It is particularly advantageous if the average grain diameter is not more than 100 mesh since as the grain diameter is increased, the effect of the addition of the mineral, dispersibility, modiability, and so forth are reduced.

In order that the effects of the composite of the present invention to be exhibited effectively, it is necessary that the above mineral be added in the range of approximately 0.3 to 5 parts by weight, per part by weight of the ceramic fibers. If the amount of the mineral added is less than 0.3 part by weight, unsatisfactory corrosion resistance will result. If it is in excess of 5 parts by weight unsatisfactory dimensional stability will result, thus the range of 0.5 to 3.5 parts by weight is advised.

When these minerals are used in combination with the above ceramic fibers, there can be obtained a fibrous composite material which is superior in corrosion resistance, dimensional stability, and heat-insulating properties. Although the exact reason why the above effects are obtained is not clear, it is believed that they are ascribable to the morphology, surface characteristics, crystal structure, and composition of each micaceous mineral as described above, and their relation relative to the ceramic fibers.

In preparation of the fibrous composite material of the present invention, it is desirable to also add an inorganic binder in order to increase the adhesion strength of the composite. Suitable examples of such inorganic binders are colloidal binders of silica, alumina, zirconia, and the like, liquid binders of sodium silicate, aluminum phosphate, and the like, and powdered binders of Portland cement, alumina cement, and the like. It is to noted that the present invention is not limited thereto.

A dispersant and/or a plasticizer added to the composite of the present invention uniformly disperses or mixes the constituents described above, and increases the moldability of the resulting composite. Suitable examples of such dispersants and plasticizers are carboxymethyl cellulose, hydroxyethyl cellulose, starch, polyacrylate, polyamide, polyethylene oxide, and the like.

Also, refractory powder particles may be added to the above described composite by five weight parts or less per one weight part of alumino silicate-based ceramic fibers. As the refractory powder particles, one or more may be selected from the group consisting of high alumina-based materials such as bauxite, mullite, kyanite, and the like, alumina, and titanium oxide.

The composite of the present invention has various advantages in production and application. The present invention can be produced in a paste form, can be used as a lining material for molten metal containers of various shapes, and can be applied in situ in any desired form depending on the shape of the container, thereby producing jointless heat-insulating walls. These advantages are due to the composite's superior dimensional stability, minimal heat shrinkage and superior corrosion resistance.

The composite of the present invention is very superior in non-wetting properties and corrosion resistance for metals in addition to aluminum, such as zinc, tin and lead. Thus, it is also suitable for use in applications with these metals.

The invention will be more fully understood from the examples which follows.

EXAMPLE 1

1,000 g of alumino silicate-based ceramic fibers, 2,000 g of powdered muscovite adjusted to 100 mesh or less in grain diameter, 20 g of carboxymethyl cellulose, 300 g of a colloidal silica solution (30% solids), and 3,000 g of water were mixed and stirred in kneader to prepare a paste-like material. This paste-like material was molded into a crucible, and the crucible was then dehydrated by drying for 24 hours in a drier maintained at 110° C., whereupon a hard crucible mold having an almost exact form could be obtained.

Pure aluminum and various aluminum alloys were each placed in the crucible mold. The crucible mold was then placed in an electric furnace and maintained at 750° C. for 150 hours. The aluminum alloys used were Al-Si, Al-Si-Cu, Al-Si-Mg, and Al-Mg. All the pure aluminum and aluminum alloys were in a molten state at a temperature of 750° C. Upon inversion of the crucible mold after cooling, the solidified pure aluminum and aluminum alloys dropped out easily. Abnormalities such as attachment of the metal, chemical reactions, and physical damage were not observed in areas of the crucible mold that came into contact with the moltem metal.

EXAMPLE 2

The procedure of Example 1 was repeated wherein the muscovite was replaced by phlogopite, biotite, sericite, or vermiculite. In all cases, the same results as in Example 1 were obtained.

EXAMPLE 3

Composition having the formulations shown in Table 1 were prepared and tested in the same manner as in Example 1. The same results are shown in Table 2.

It can be seen from Table 2 that for the composite material of Japanese Patent Publication No. 17147/83 the minimum heat shrinkage is 1.6% (200° F., 16 hours), whereas in the composite of the present invention, the heat shrinkage is superior, reaching a maximum of 1% (1,000° C., 24 hours).

TABLE 1

| | Composition Constituents (parts by weight) | | | | |
|---|---|---|---|---|---|
| Run No. | Alumino Silicate-Based Ceramic Fibers | Powdered Mica (100 mesh or less) | Colloidal Silica Solution (30% Solids) | Carboxylmethyl Cellulose | Water |
| 1 | 1 | 0.3 | 0.5 | 0.02 | 2.5 |
| 2 | 1 | 0.7 | 0.4 | 0.02 | 2.5 |

TABLE 1-continued

| | Composition Constituents (parts by weight) | | | | |
|---|---|---|---|---|---|
| Run No. | Alumino Silicate-Based Ceramic Fibers | Powdered Mica (100 mesh or less) | Colloidal Silica Solution (30% Solids) | Carboxylmethyl Cellulose | Water |
| 3 | 1 | 2.0 | 0.4 | 0.02 | 3.0 |
| 4 | 1 | 5.0 | 0.3 | 0.02 | 4.0 |

TABLE 2

| | Physical Values and Corrosion Test Results for the Composition Constituents of Table 1 | | | | | | |
|---|---|---|---|---|---|---|---|
| | | | Thermal | Dry Shrinkage (%) | Heat Shrinkage (%) | | Results of |
| Run No. | Specific Gravity of Paste (g/cm³) | Dry Density (g/cm³) | Conductivity (kcal/m.n. °C.) | 110° C. × 24 hours | 750° C. × 24 hours | 1,000° C. 24 hours | Aluminum Melt Corrosion Test |
| 1 | 1.2 | 0.3 | 0.15 | 0.1 | 0.1 | 0.5 | Slight corrosion |
| 2 | 1.3 | 0.5 | 0.18 | 0.2 | 0.1 | 0.6 | Good |
| 3 | 1.4 | 0.8 | 0.25 | 0.3 | 0.2 | 0.8 | Good |
| 4 | 1.6 | 1.2 | 0.4 | 0.5 | 0.2 | 1.0 | Good |

What is claimed is:

1. A fibrous composite material for use primarily in contact with fused aluminum or aluminum alloys consisting essentially of:
    1 part by weight of alumino silicate-based ceramic fibers,
    from 0.3 to 5 parts by weight of at least one micaceous mineral selected from the group consisting of muscovite, phlogopite, biotite, and sericite,
    up to 5 parts by weight of refractory powder particles per part by weight of the ceramic fibers, an inorganic binder, a dispersant, a plasticizer, and water, wherein said inorganic binder is a colloidal binder selected from the group consisting of silica, alumina and zirconia.

2. A material as claimed in claim 1, wherein the dispersant and plasticizer are selected from the group consisting of carboxymethyl cellulose, hydroxyethyl cellulose, starch, polyacrylate, polyamide, and polyethylene oxide.

3. A material as claimed in claim 1 containing from 0.5 to 3.5 parts by weight of the micaceous mineral.

4. A material as claimed in claim 1 in which the ceramic fibers have an alumina content of from 40 to 70% by weight, a silica content of from 30 to 60% by weight, a fiber diameter of from 1 to 5 μm and a fiber length greater than about 1,000 times the fiber diameter.

5. A material as claimed in claim 1 in which the refractory powder particles are selected from the group consisting of bauxite, mullite, kyanite, alumina and titanium oxide.

6. A method of producing a molded article without application of heat which comprises
    (1) preparing a paste consisting essentially of
        1 part by weight of alumina silicate-based ceramic fibers, an inorganic binder selected from the group consisting of colloidal silica, colloidal alumina and colloidal zirconia, a dispersant, a plasticizer, water,
        from 0.3 to 5 parts by weight of at least one micaceous mineral selected from the group consisting of muscovite, phlogopite, biotite and sericite, and
        up to 5 parts by weight of refractory powder particles calculated in the weight of the ceramic fibers,
    (2) molding the paste in the desired form of the article,
    (3) drying and dehydrating the molded article.

7. A method as claimed in claim 6 containing from 0.5 to 3.5 parts by weight of the micaceous mineral.

8. A method as claimed in claim 6 in which the ceramic fibers have an alumina content of from 40 to 70% by weight, a silica content of from 30 to 60% by weight,
    a fiber length greater than about 1,000 times the fiber diameter.

9. A method as claimed in claim 6 in which the refractory powder particles are selected from the group consisting of bauxite, mullite, kyanite, alumina and titanium oxide.

* * * * *